(No Model.)
C. H. GRAY.
PNEUMATIC TIRE.
No. 491,479. Patented Feb. 7, 1893.
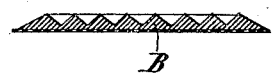
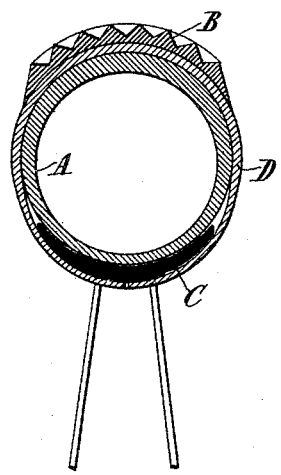
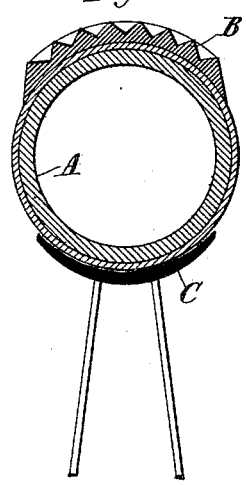
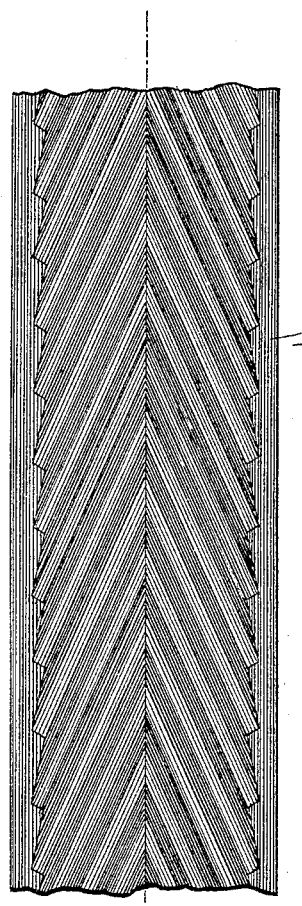
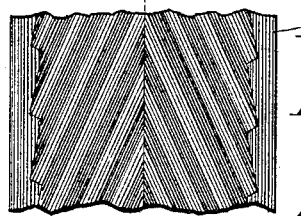
Witnesses:—
George Barry
Robert Bacon Seward
Inventor.—
Christian H. Gray
by attorneys
Brown & Seward
THE NORRIS PETERS CO., PHOTO-LITHO., WASHINGTON, D. C.

UNITED STATES PATENT OFFICE.

CHRISTIAN H. GRAY, OF SILVERTOWN, ENGLAND.

PNEUMATIC TIRE.

SPECIFICATION forming part of Letters Patent No. 491,479, dated February 7, 1893.

Application filed July 28, 1892. Serial No. 441,432. (No model.)

*To all whom it may concern:*

Be it known that I, CHRISTIAN HAMILTON GRAY, engineer, of Silvertown, in the county of Essex, England, have invented certain new and useful Improvements in the Manufacture and Repair of Tubular Pneumatic Tires for Velocipedes, of which the following is a specification.

This invention relates to the manufacture and repair of tubular pneumatic tires, the objects being to secure them against lateral slip, and to improve the running powers of the velocipede to which they are attached. I form the tread of the tire with diagonal ribs extending in reverse directions from the center line of the tread to the opposite edges thereof, such lines of ribs having an inclination of some twenty-five degrees, more or less, from the center line of the tread.

In the accompanying drawings, Figures 1 and 1ª show in partial plan view, and Fig. 2 in cross section, a strip of rubber compound forming my improved ribbed tread. Fig. 3 shows, in cross section, a pneumatic tire with the ribbed tread applied thereto, and forming one with the tube. Fig. 4 is a similar cross section of another kind of pneumatic tire, in which the tube is distinct from the covering which forms the tread, and to which covering my invention is applied.

The diagonal ribs are shown in Fig. 1 as meeting on the central dotted line 1—1. But instead of meeting, they may overreach the one the other, or "break joint," as shown at Fig. 1ª.

The diagonal ribs in either of the examples represented extending from the center line of the tread in reverse directions to the opposite edges thereof, tend to lighten the run of the wheel, for when the approximating ends of the diagonal ribs reach the ground and are compressed, the ribs will lean toward each other and in recoiling from their compressed state they will act as levers to propel the wheel forward.

In carrying out the manufacture of the tubular pneumatic tires, I may proceed in two or more ways, and obtain the same or similar results. Thus, I mold the strip of rubber compound which is to form the ribbed tread, as shown at Fig. 1 or 1ª, and partially vulcanize the same. The pneumatic tube I produce in the ordinary way, and partially vulcanize it also. These two parts of the tire I then connect together by india rubber cement, and completely vulcanize the whole. I thus obtain a section of tire such as that shown at Fig. 3. Or, in place of combining the tube and the strip in this manner, the ribbed tread and tube may be made together, and after joining up the ends, subjected to complete vulcanization in a mold. This mode of working will produce a like section to that shown at Fig. 3,—A being the tube, and B the ribbed tread. C is the rim of the wheel into which the pneumatic tire is fitted.

In some cases, I propose to apply the molded and cured strip to the cured tube by cement, and in order to insure a firm attachment of the strip, I may apply to its inner face, before vulcanization, a "swan's down" or napped cotton fabric, as a backing, or any woven fabric that will withstand the vulcanizing heat. This backing is indicated by the dotted line in Fig. 2.

Fig. 4 shows a strip of the character represented at Figs. 1 and 2, applied to the covering by which pneumatic tubes are frequently secured in place in the wheel rim. In this figure, A is the tube seated in the rim C, and secured in place by the covering D, which covering has attached to it, by cement, the ribbed tread B.

In place of applying the molded tread to the covering D, the two may be molded together in molds marked with this special style of diagonal rib. I also propose to employ the molded treads, Figs. 1 and 1ª, for repairing ribbed pneumatic tubes (made as above described), when the tread is worn down, the tire being first submitted to a grinding action such as that of an emery wheel, to remove the unworn portion of the ribs, before applying the cement to secure the fresh ribbed tread in place.

I claim—

A tubular pneumatic tire having a tread composed of diagonal ribs extending in reverse directions from its center to its opposite edges, substantially as herein set forth.

CHRISTIAN H. GRAY.

Witnesses:
H. K. WHITE,
H. T. C. GOLTZ.